(12) United States Patent
Wang et al.

(10) Patent No.: US 8,341,655 B2
(45) Date of Patent: Dec. 25, 2012

(54) SLOT-IN OPTICAL DISC DRIVE WITH DISC LOADING/UNLOADING MECHANISM

(75) Inventors: Ta-Hsiang Wang, Hsinchu (TW); Yung-Han Wu, Hsinchu (TW)

(73) Assignee: Philips & Lite-on Digital Solutions Corporation, Taipei (TW)

( * ) Notice: Subject to any disclaimer, the term of this patent is extended or adjusted under 35 U.S.C. 154(b) by 0 days.

(21) Appl. No.: 12/951,264

(22) Filed: Nov. 22, 2010

(65) Prior Publication Data
US 2012/0036520 A1    Feb. 9, 2012

(30) Foreign Application Priority Data

Aug. 9, 2010    (CN) .......................... 2010 1 0251000

(51) Int. Cl.
*G11B 17/051*    (2006.01)
*G11B 17/04*    (2006.01)

(52) U.S. Cl. ........................................ 720/622; 720/626
(58) Field of Classification Search ........... 720/619–626
See application file for complete search history.

(56) References Cited

U.S. PATENT DOCUMENTS
2002/0159373 A1*    10/2002    Saji et al. ..................... 369/77.1
* cited by examiner

*Primary Examiner* — Craig A. Renner
*Assistant Examiner* — Gustavo Polo
(74) *Attorney, Agent, or Firm* — McClure, Qualey & Rodack, LLP (57) ABSTRACT

A slot-in optical disc drive is provided to comprise a driving element moveably disposed in the optical disc and capable of moving toward a disc loading direction and a disc unloading direction, wherein the driving element has a loading drive groove; a disc loading element pivoted in the optical disc drive, wherein the disc loading element has a loading driven pin for operating with the loading drive groove; a disc unloading element pivoted in the optical disc drive; and an elastic element used for providing an elastic force on the disc unloading element.

8 Claims, 7 Drawing Sheets

SLOT-IN OPTICAL DISC DRIVE WITH DISC LOADING/UNLOADING MECHANISM

This application claims the benefit of People's Republic of China application Serial No. 201010251000.0, filed Aug. 9, 2010, the subject matter of which is incorporated herein by reference.

BACKGROUND OF THE INVENTION

1. Field of the Invention

The invention relates in general to an optical disc drive, and more particularly to a slot-in optical disc drive.

2. Description of the Related Art

The optical disc drive can be classified into the tray type optical disc drive and the slot-in optical disc drive. As to the slot-in optical disc drive, a disc loading/unloading slot is disposed at one side of the optical disc drive, and a disc loading/unloading mechanism is disposed inside the optical disc drive. After user pushes the optical disc into the optical disc drive for a predetermined distance from the disc loading/unloading slot, the disc loading/unloading mechanism will be driven to further bring the optical disc to a reading position inside the optical disc drive.

In recent slot-in optical disc drive, the disc loading/unloading mechanism is composed by complicated lever mechanisms. However, the optical disc drive is developed to be lighter and thinner, and the complicated lever mechanisms of the disc loading/unloading mechanism can not efficiently reduce the weight of the optical disc drive. Besides, the complicated lever mechanisms contain more elements, and the cost of the disc loading/unloading mechanism is, therefore, increased.

Moreover, in recent slot-in optical disc drive, it is usually designed only for loading and reading the 12 cm optical disc but not for the 8 cm optical disc. Therefore, if user mistakenly puts the 8 cm optical disc into the slot-in optical disc drive, the disc loading/unloading mechanism will be out of function. Moreover, it may cause the damage of the optical disc drive.

SUMMARY OF THE INVENTION

Accordingly, the invention provides a slot-in optical disc drive that can efficiently reduce the cost and the weight of the optical disc drive by simple structure of the disc loading/unloading mechanism and raise the competition position of the optical disc drive in the market.

According to a first aspect of the present invention, a slot-in optical disc drive is provided to comprise a driving element moveably disposed in the optical disc and capable of moving toward a disc loading direction and a disc unloading direction, wherein the driving element has a loading drive groove; a disc loading element pivoted in the optical disc drive, wherein the disc loading element has a loading driven pin for operating with the loading drive groove; a disc unloading element pivoted in the optical disc drive; and an elastic element used for providing an elastic force on the disc unloading element. When the driving element moves toward the disc unloading direction, the loading driven pin relatively moves in the loading drive groove and drives the disc loading element to rotate and push a disc into the optical disc drive. When the driving element moves toward the disc loading direction, the elastic force provided from the elastic element drives the disc unloading element to rotate and push the disc out of the optical disc.

According to a second aspect of the present invention, a slot-in optical disc drive is provided to comprise a disc unloading element, pivoted in the optical disc drive; an elastic element, used for providing an elastic force on the disc unloading element; and a small disc ejecting element, pivoted on the disc unloading element for ejecting a small disc, wherein the small disc ejecting element and the disc unloading element are crossed and disposed like an "X" letter, wherein the small disc ejecting element is driven by the elastic force from the elastic element to eject the small disc out of the optical disc drive.

BRIEF DESCRIPTION OF THE DRAWINGS

The invention will become apparent from the following detailed description of the preferred but non-limiting embodiments. The following description is made with reference to the accompanying drawings.

DETAILED DESCRIPTION OF THE INVENTION

Figure 1:
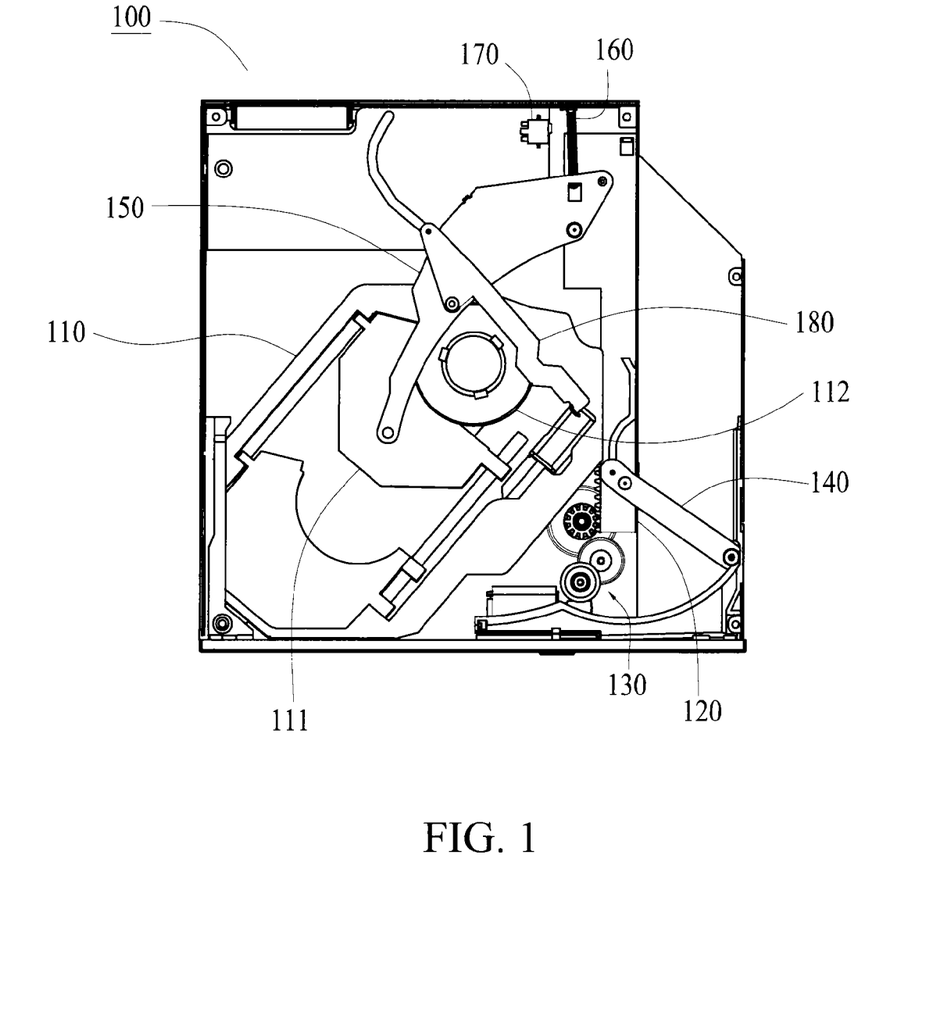
FIG. 1 shows an inner structure of a slot-in optical disc drive according to a preferred embodiment of the present invention.

Please refer to FIG. 1. FIG. 1 shows an inner structure of a slot-in optical disc drive according to a preferred embodiment of the present invention.

According to the preferred embodiment of the present invention, a slot-in optical disc drive 100 is provided to comprise a chassis 110, a driving element 120, a disc loading element 140 and a disc unloading element 150. A spindle motor 112 for supporting and rotating a disc and an optical pickup head 111 for reading data stored on the disc are disposed on the chassis 110. The driving element 120 is movably disposed in the optical disc drive 100. The optical disc drive 100 further comprise a motor driving module for driving the driving element 120 to move toward a disc loading direction or a disc unloading direction. The disc loading element 140 and the disc unloading element 150 are respectively pivoted and disposed in the optical disc drive 100. When the driving element 120 is moved toward the disc unloading direction, the driving element 120 brings the disc loading element 140 to rotate and load the disc into the optical disc drive 100. The optical disc drive 100 further comprises an elastic element 160 for providing an elastic force on the disc unloading element 150 and rotating the disc unloading element 150 to unload the disc.

In the preferred embodiment of the present invention, the slot-in optical disc drive 100 further comprises a driving switch 170 disposed on the rotating route of the disc unloading element 150 for stating the motor driving module 130. In an another preferred embodiment of the present invention, unless all of the elements mentioned above, the slot-in optical disc drive 100 further comprises a small disc ejecting element 180 for ejecting a small disc, which is mistakenly loaded into the optical disc drive 100.

The detailed description of the elements of the slot-in optical disc drive 100 according to the preferred embodiment of the present invention is described below.

Figure 2:
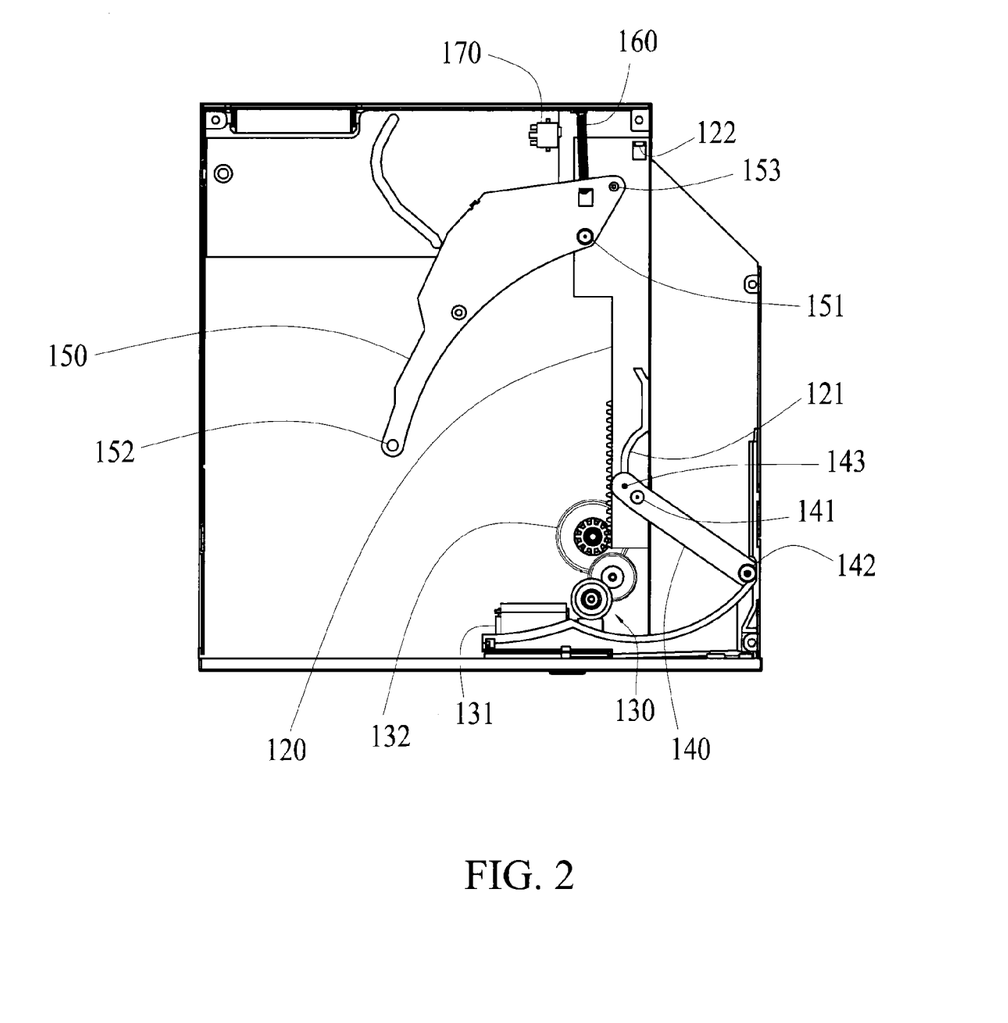
FIG. 2 shows a disc loading/unloading elements according to the preferred embodiment of the present invention.

Please refer to FIG. 2. FIG. 2 shows the disc loading/unloading elements according to the preferred embodiment of the present invention.

In the preferred embodiment of the present invention, the motor driving module 130 comprises a motor 131 and a gear assembly 132. The motor 131 drives the driving element 120 to move through the gear assembly 132. Moreover, by controlling the rotating direction of the motor 131, the driving element 120 is controlled to move toward the disc loading direction or the disc unloading direction. The driving element 120 has a loading drive groove 121 and a push block 122. The disc loading element 140 is pivoted in the optical disc drive by a rotating pin 141. One end of the disc loading element 140 has a disc loading pin 142 for pushing the disc to move into the optical disc drive, and the other end of the disc loading element 140 has a loading driven pin 143 for cooperating with the loading driving groove 121. When the driving element 120 is moved, the loading driven pin 143 relatively moves in the loading driving groove 121 and, therefore, drives the disc loading element 140 to rotate around the rotating pin 141. The disc unloading element 150 is pivoted in the optical disc drive by a rotating pin 151. One end of the disc unloading element 150 has a disc unloading pin 152 for pushing the disc move out of the optical disc drive, and the other end of the disc unloading element 150 has a protruding pin 153.

Figure 3:
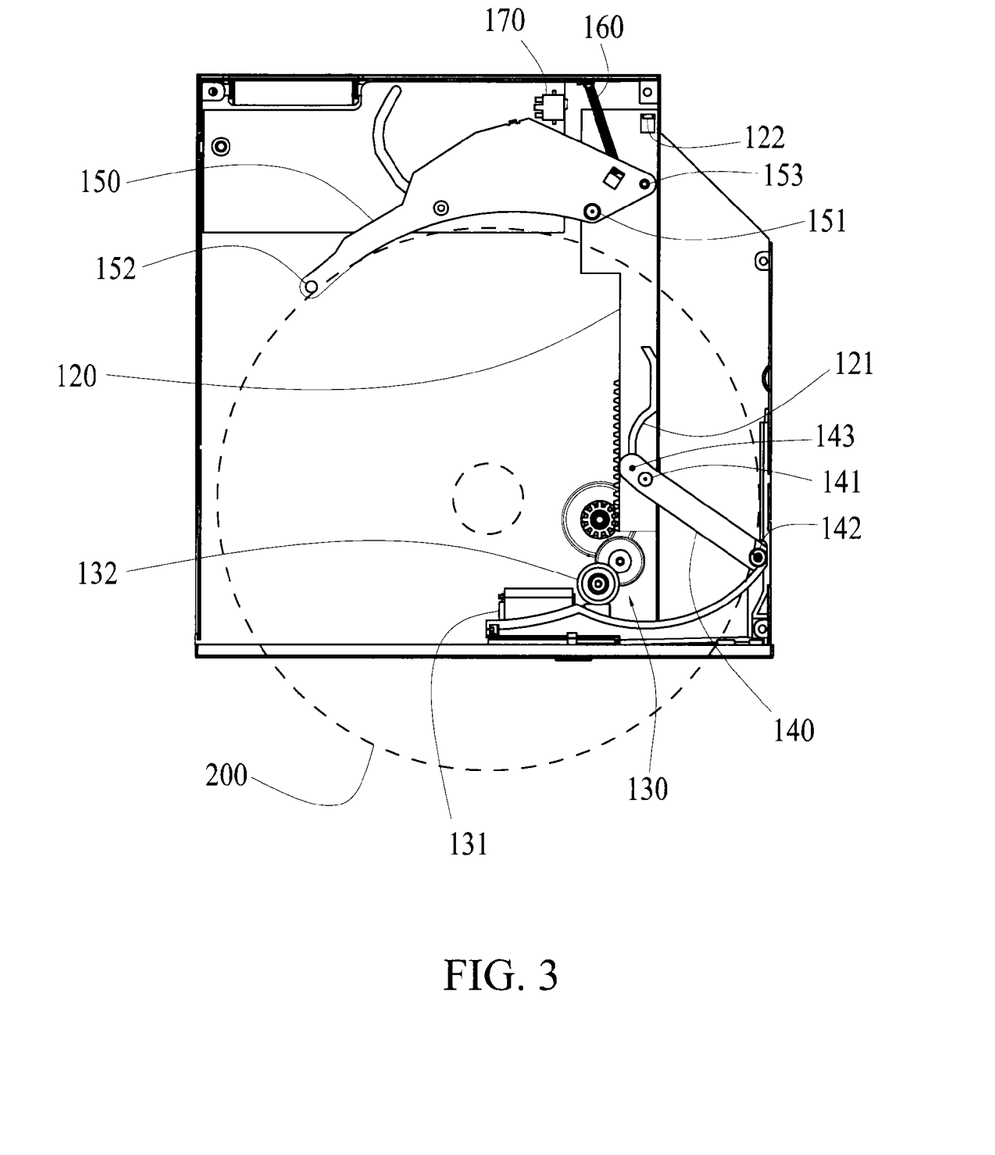
FIG. 3 shows the disc loading/unloading mechanism during a first disc loading process.
Figure 4:
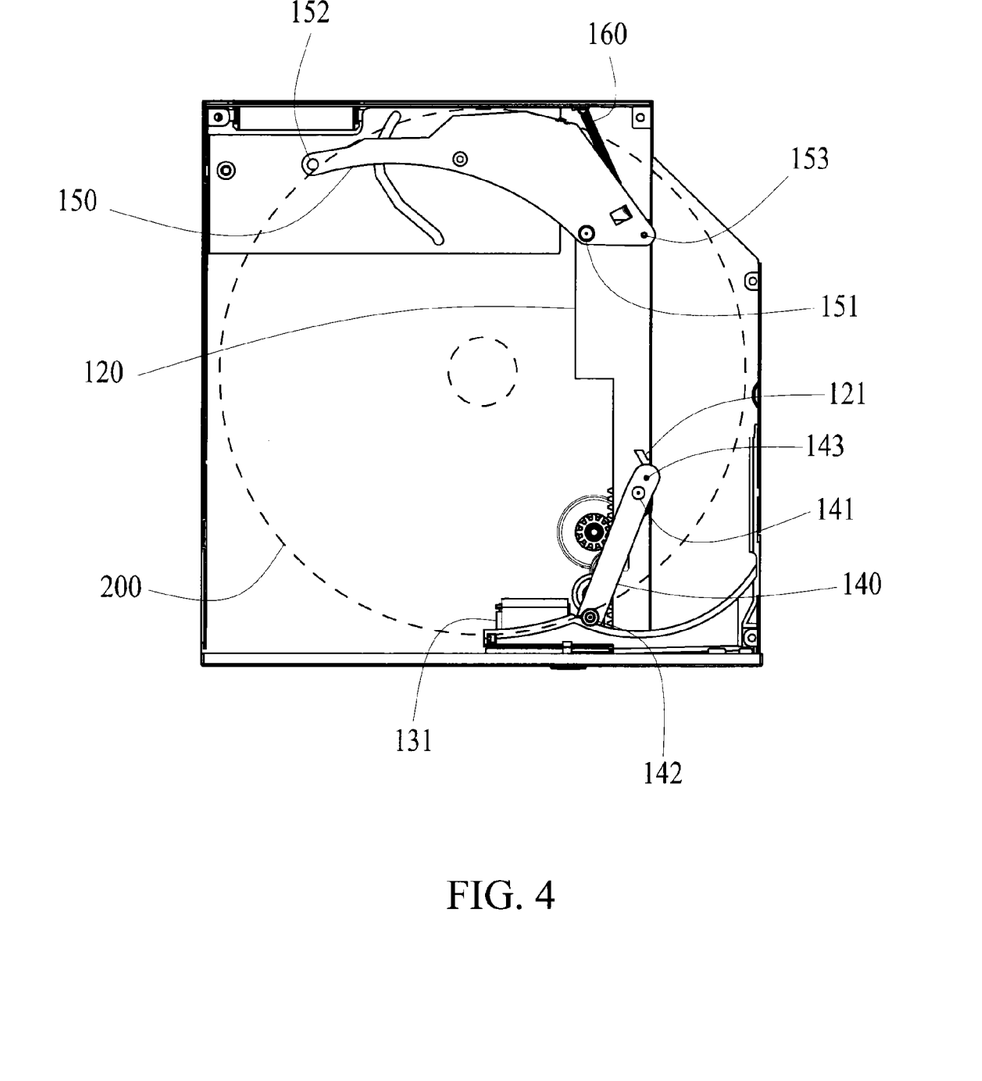
FIG. 4 shows the disc loading/unloading mechanism during a second disc loading process.
Figure 5:
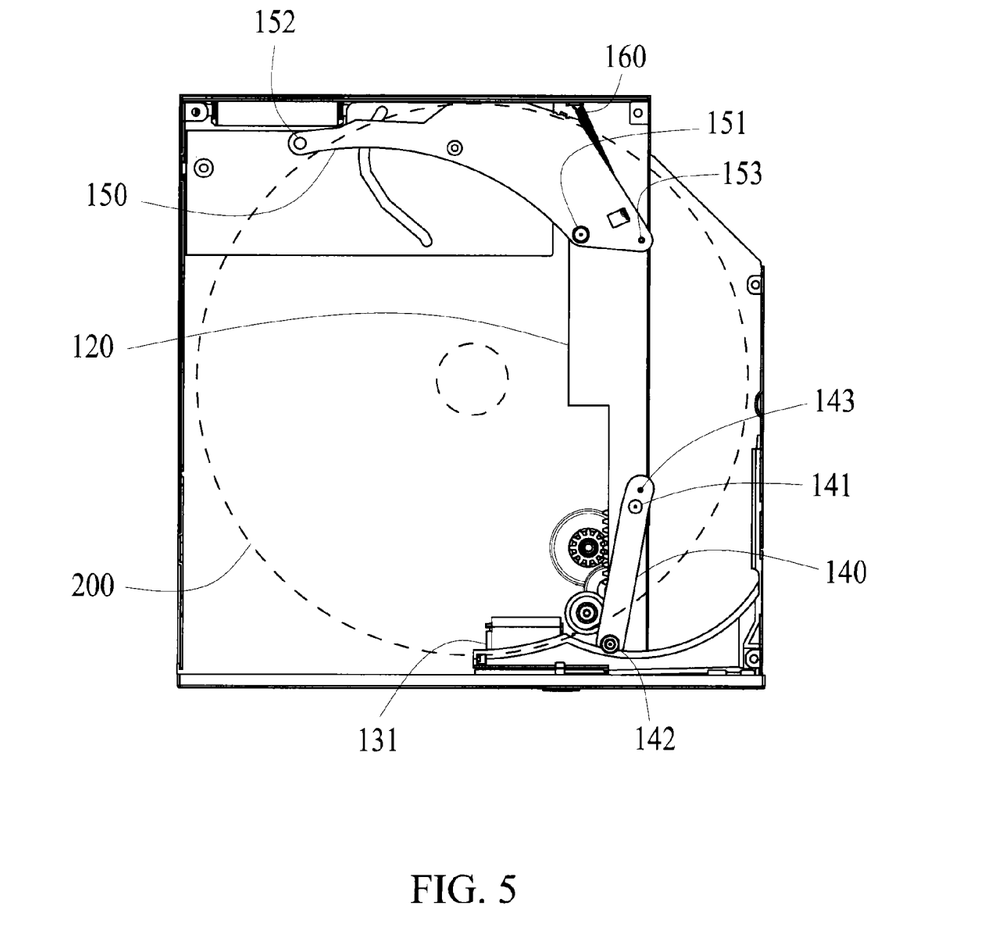
FIG. 5 shows the disc loading/unloading mechanism during a third disc loading process.

Please refer to FIG. 3, FIG. 4 and FIG. 5, which respectively shows the disc loading/unloading mechanism during a first, a second and a third disc loading process. During the first disc loading process, the disc is manually pushed into the optical disc drive, and the motor 131 has not driven. During the second disc loading process, the motor is started, and the disc is supported on the spindle motor 112 but has not been rotated. During the third disc loading process, the disc is supported on the spindle motor 112, and the spindle motor 112 is started to rotate.

Please refer to FIG. 3. During the first disc loading process, when a disc 200 is manually pushed into the optical disc drive, the disc 200 contacts the disc unloading pin 152 and pushes the disc unloading element 150 against the elastic force provided from the elastic element 160 to rotate around the rotating pin 151. The lager pushing distance the disc 200 is pushed, the lager rotating angle the disc unloading element 150 rotates. Since the driving switch 170 is disposed on the rotating route of the disc unloading element 150, the disc unloading element 150 will touch the driving switch 170 at a predetermined angle wherein the disc 200 has been pushed at a predetermined distance, and the motor 131 will be started to end the first disc loading process.

Next, please refer to FIG. 4. The second disc loading process starts from the start of the motor 131 which is triggered by the driving switch 170. The driving element 120 is driven by the motor 131 and is moved toward the disc unloading direction. During the movement of the driving element 120, the loading drive groove 121 drives the disc loading element 140 to rotate around the rotating pin 141 through the cooperation between the loading drive groove 121 and the loading driven pin 143. Therefore, the disc 200 is further pushed into the optical disc drive by the rotation of the disc loading element 140. More specifically, when the disc loading element 140 is driven to rotate by the driving element 120, the disc loading pin 142 contacts the disc 200 and pushes the disc 200 to further move into the optical disc drive. During that time, the disc 200 still contacts with the disc unloading pin 152 and also pushes the disc unloading element 150 against the elastic force provided from the elastic element 160 to rotate around the rotating pin 151. Until the disc 200 is completely loaded into the optical disc drive and is supported on the spindle motor 112, the second disc loading process ends. Comparing the first disc loading process with the second disc loading process, the disc is pushed by user during the first disc loading process, but the disc is pushed by motor during the second disc loading process.

Please refer to FIG. 5. During the third disc loading process, the motor 131 further drives the driving element 120 to move toward the disc unloading direction, and the loading drive groove 121 drives the disc loading element 140 to anti-rotate around the rotating pin 141 so that the disc loading pin 142 is moved away from contacting the disc 200. In the meanwhile, the push block 122 disposed on the driving element 120 pushes the protruding pin 153 disposed on the disc unloading element 150 so that the disc unloading element 150 is further rotated around the rotating pin 151 and the disc unloading pin 152 is moved away from contacting the disc 200. After that, the motor 131 is stopped, and the third disc loading process ends. The spindle motor 112, therefore, starts to rotate the disc 200, and the optical disc drive enters a disc reading process.

The process for unloading the disc out of the optical disc drive is a reverse process for loading the disc into the optical disc drive. When receiving a disc unloading signal, the motor 131 is started to drive the driving element 120 to move toward the disc loading direction. According to the movement of the driving element 120, the loading drive groove 121 drives the disc loading element 140 to move, and the push block 122 releases the protruding pin 153 disposed on the disc unloading element 150. Therefore, the disc loading pin 142 of the disc loading element 140 and the disc unloading pin 152 of the disc unloading element 150 return to contact the disc 200 again as shown in FIG. 4. With the further movement of the driving element 120, the loading drive groove 121 drives the disc loading element 140 to return to the original position that before loading the disc. In the meanwhile, the disc unloading element 150 is anti-rotated around the rotating pin 151 under the elastic force provided from the elastic element 160. During the anti-rotation of the disc unloading element 150, the disc unloading pin 152 contacts the disc 200 and pushes the disc 200 out of the optical disc drive. At that time, the disc loading and unloading elements return to the original position that before loading the disc as shown in FIG. 2.

According to the slot-in optical disc drive provided in the preferred embodiment of the present invention, by cooperating with the driving element and the elastic element, only single disc loading element and single disc unloading element are used for achieving the disc loading and unloading functions. In compare with the prior disc loading/unloading mechanism, the present invention greatly reduces the amount of the level elements. Therefore, both of the cost and the weight of the optical disc drive are reduced for efficiently increasing the position of the marketing competition.

Based on the preferred embodiment mentioned above, the present invention further provides another embodiment which uses another single small disc ejecting element 180 for avoiding a small disc from being mistakenly loaded into the optical disc drive.

Figure 6:
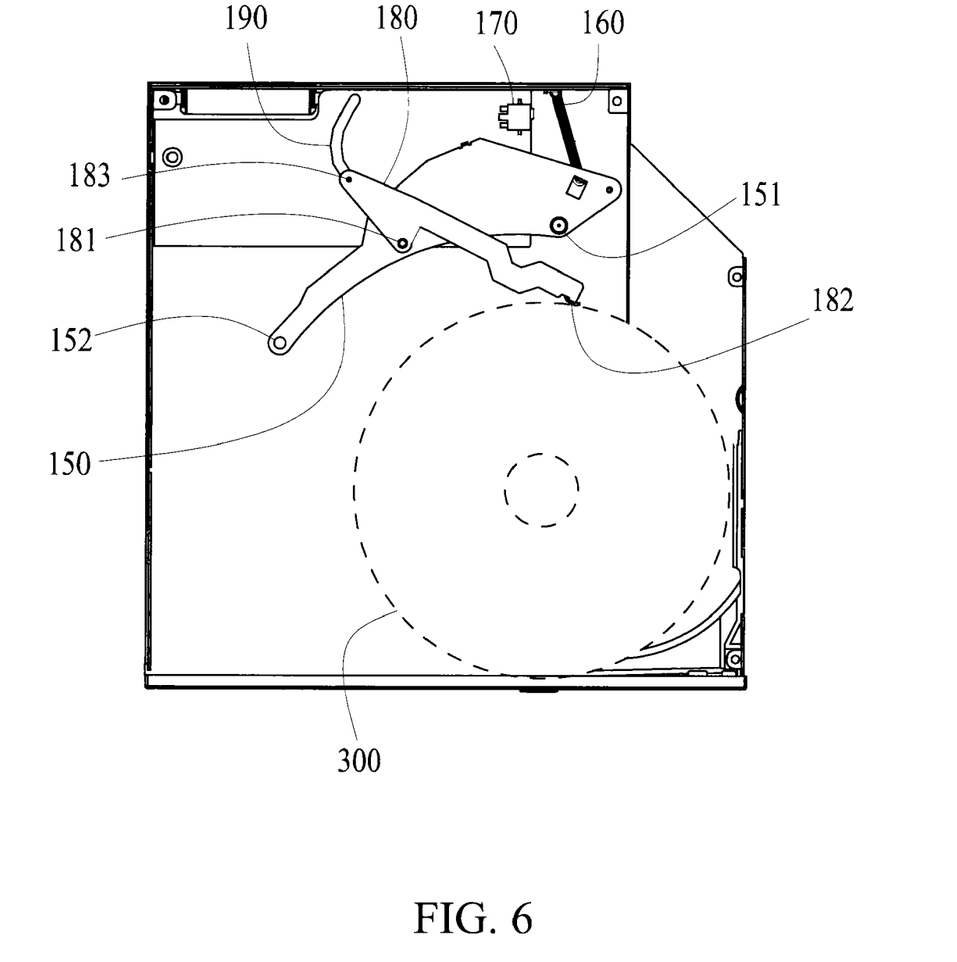
FIG. 6 shows a small disc ejecting element when a small disc is pushed into the slot-in optical disc drive according to an another preferred embodiment of the present invention.
Figure 7:
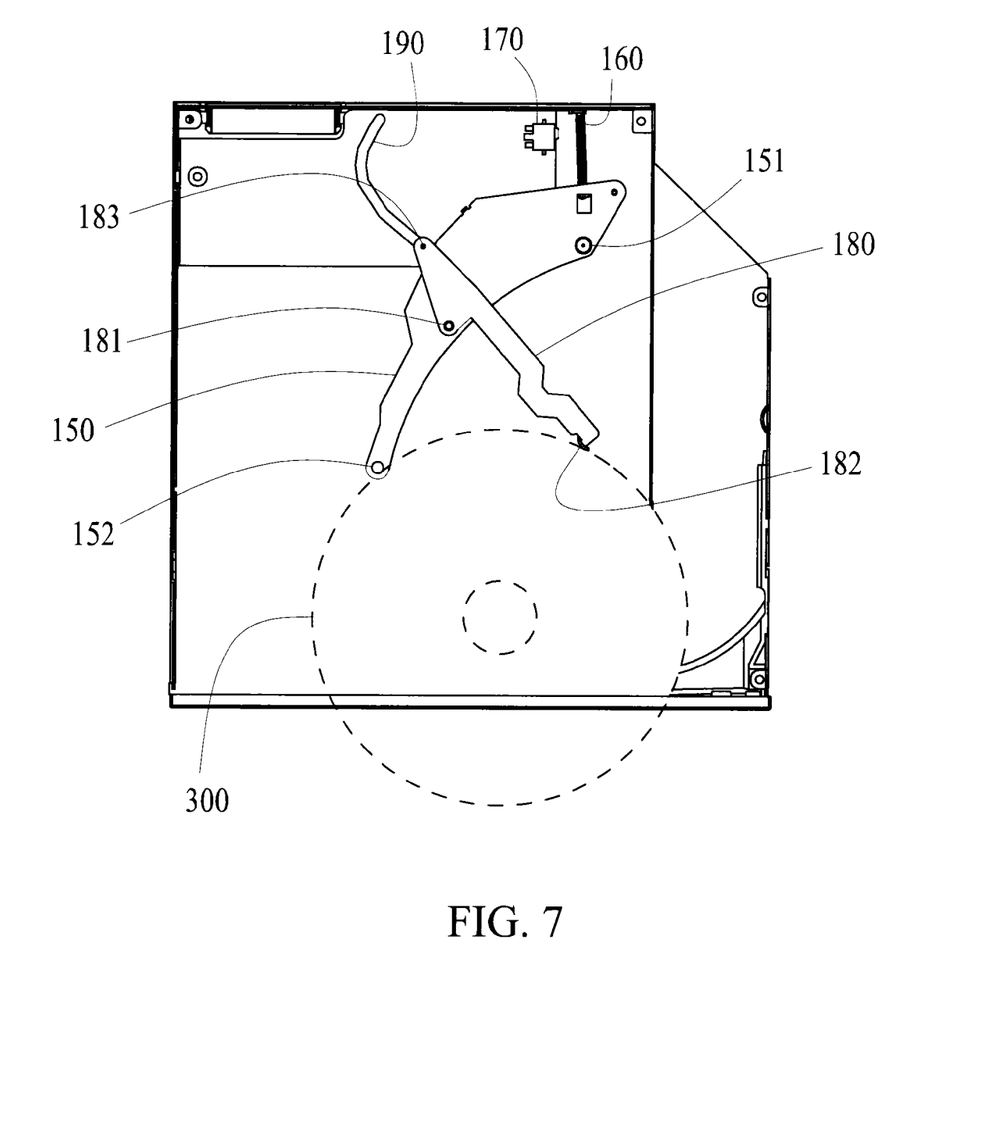
FIG. 7 shows the small disc ejecting element when ejecting the small disc from the slot-in optical disc drive.

Please refer to FIG. 6 and FIG. 7, which respectively shows a small disc ejecting element 180 when a small disc 300 is pushed into the slot-in optical disc drive and when ejecting the small disc from the slot-in optical disc drive according to another preferred embodiment of the present invention.

In this embodiment, the slot-in optical disc drive further comprises a small disc ejecting element 180. The small disc ejecting element 180 is pivoted on the disc unloading element 150 by a rotating pin 181, and the rotating pin 181 is disposed between the rotating pin 151 and the disc unloading pin 152. Accordingly, the small disc ejecting element 180 and the disc unloading element 150 are crossed and disposed like an "X" letter. One end of the small disc ejecting element 180 has a disc contacting surface 182, and the other end has a guiding pin 183. The guiding pin 183 is operated with s guiding groove 190 disposed in the optical disc drive.

When a small disc 300 is manually pushed into the optical disc drive, the small disc contacts the disc contacting surface 182 and pushes the small disc ejecting element 180 so that the guiding pin 183 is moved along the guiding groove 190. At the same time, the small disc ejecting element 180 is also rotated around the guiding pin 183. Besides, since the small disc ejecting element 180 is pivoted on the disc unloading element 150, the small disc ejecting element 180 also drives the disc unloading element 150 to rotate against the elastic force provided from the elastic element 160 when the small disc ejecting element 180 is moved and rotated by the push of the small disc 300. In other words, During the process that user manually pushes the small disc into the optical disc drive, the elastic element 160 continues to provide the elastic force against the pushing action of the small disc 300. Therefore, as the user takes his/her hand away from the small disc, the elastic force provided from the elastic element 160 drives the disc unloading element 150 and the small disc ejecting element 180 to return their original positions that before loading the disc. Accordingly, the small disc 300 is ejected out of the optical disc drive as shown in FIG. 7.

In this embodiment, the rotating angle of the disc unloading element 150 when the small disc 300 entirely enters the optical disc drive as shown in FIG. 6 is smaller than the rotating angle of the disc unloading element 150 when the disc unloading element 150 contacts the driving switch 170 as shown in FIG. 3. In other words, if the rotating angle of the disc unloading element 150 when the small disc 300 c entirely enters the optical disc drive is first angle, and the rotating angle of the disc unloading element 150 when the disc unloading element 150 contacts the driving switch 170 is second angle, the second angle is larger than the first angle. Therefore, when the small disc 300 entirely enters the optical disc drive, the rotating angle of the disc unloading element 150 is not enough to contact the driving switch 170 so that the motor 170 will not be started, and the disc unloading element 150 and the small disc ejecting element 180 can be driven by the elastic force provided from the elastic element 160 to eject the small disc 300 out of the optical disc drive. In this embodiment, the small disc entirely enters into the optical disc drive means that when the user manually pushes the entire small disc into the optical disc drive, wherein the small disc is entirely contained inside the optical disc drive, and the circumference of the small disc is tangent with the front side the optical disc drive as shown in FIG. 6.

According to the preferred embodiment of the present invention, it only needs single small disc ejecting element operated with the disc unloading element to avoid the small disc from being mistakenly loaded into the optical disc drive.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in optical disc drive comprising:
    a driving element, moveably disposed in the optical disc drive and capable of moving toward a first direction and a second direction, wherein the first and the second directions are opposite and the driving element has a loading drive groove;
    a disc loading element, pivoted in the optical disc drive, wherein the disc loading element has a loading driven pin for operating with the loading drive groove;
    a disc unloading element, pivoted in the optical disc drive;
    an elastic element, used for providing an elastic force on the disc unloading element;
    a small disc ejecting element, pivoted on the disc unloading element for ejecting a small disc; and
    a driving switch used for starting a motor driving model;
    wherein the disc unloading element has a first rotating angle when the small disc is entirely entered into the optical disc drive, and the disc unloading element has a second rotating angle when the disc unloading element contacts the driving switch, wherein the second rotating angle is larger than the first rotating angle,
    wherein, when the driving element moves toward the first direction, the loading driven pin relatively moves in the loading drive groove and drives the disc loading element to rotate and push a disc into the optical disc drive,
    wherein, when the driving element moves toward the second direction, the elastic force provided from the elastic element drives the disc unloading element to rotate and push the disc out of the optical disc drive.

2. The slot-in optical disc drive according to claim 1 wherein the motor driving model is used for driving the driving element, wherein when the small disc is entirely entered into the optical disc drive, the motor driving model is not started.

3. The slot-in optical disc drive according to claim 2, wherein the small disc is entirely entered into the optical disc drive means that the small disc is entirely contained inside the optical disc drive, and the circumference of the small disc is tangent with the front side the optical disc drive.

4. The slot-in optical disc drive according to claim 1, wherein the small disc ejecting element and the disc unloading element are crossed and disposed like an "X" letter.

5. The slot-in optical disc drive according to claim 1, wherein one end of the small disc ejecting element has a guiding pin, which is operated with a guiding groove disposed in the optical disc drive.

6. The slot-in optical disc drive according to claim 5, wherein when the small disc is manually pushed into the optical disc drive, the small disc pushes the small disc ejecting element so that the guiding pin is moved along the guiding groove, and, at the same time, the small disc ejecting element is also rotated around the guiding pin.

7. The slot-in optical disc drive according to claim 1, wherein the small disc ejecting element is driven by the elastic force provided from the elastic element to eject the small disc out of the optical disc drive.

8. The slot-in optical disc drive according to claim 1, wherein the driving element has a push block, and the disc unloading element has a protruding pin, wherein when the disc is supported on a spindle motor, the push block pushes the protruding pin so that the disc unloading element is moved away from the disc.

* * * * *